(12) United States Patent
Yakovlev et al.

(10) Patent No.: US 11,736,353 B2
(45) Date of Patent: Aug. 22, 2023

(54) METHOD FOR IDENTIFYING NETWORK DEVICES IN COMPUTER NETWORK AND AN APPARATUS CONFIGURED TO IDENTIFY NETWORK DEVICES IN COMPUTER NETWORK

(71) Applicant: WithSecure Corporation, Helsinki (FI)

(72) Inventors: Yury Yakovlev, Helsinki (FI); Elio Alejandro Govea Aguilar, Helsinki (FI)

(73) Assignee: F-SECURE CORPORATION, Helsinki (FI)

( * ) Notice: Subject to any disclaimer, the term of this patent is extended or adjusted under 35 U.S.C. 154(b) by 0 days.

(21) Appl. No.: 17/843,651

(22) Filed: Jun. 17, 2022

(65) Prior Publication Data
US 2022/0417099 A1 Dec. 29, 2022

(30) Foreign Application Priority Data

Jun. 18, 2021 (GB) .................................. 2108754

(51) Int. Cl.
*G06F 15/173* (2006.01)
*H04L 41/08* (2022.01)
(Continued)

(52) U.S. Cl.
CPC .......... *H04L 41/0886* (2013.01); *G06F 18/22* (2023.01); *H04L 41/0816* (2013.01); *H04L 41/12* (2013.01)

(58) Field of Classification Search
CPC ............. H04L 61/0886; H04L 63/0816; H04L 69/164; G06F 18/22
See application file for complete search history.

(56) References Cited

U.S. PATENT DOCUMENTS 8,438,184 B1 5/2013 Wang et al.
9,165,124 B1 10/2015 Gurevich et al.
(Continued)

FOREIGN PATENT DOCUMENTS

| CN | 108 363 811 | 8/2018 |
|---|---|---|
| EP | 3 462 359 | 4/2019 |
| RU | 2 659 736 | 7/2018 |

OTHER PUBLICATIONS

Combined Search and Examination Report for GB2108754.9, dated Nov. 23, 2021, 2 pages.

*Primary Examiner* — Thanh T Nguyen
(74) *Attorney, Agent, or Firm* — Nixon & Vanderhye

(57) ABSTRACT

A method for identifying devices in a computer network includes collecting data points including device related parameters/information from a device accessing network resources, determining a string distance between the set of collected data points with the data sets collected from previously known network devices and selecting the smallest string distance value and/or highest similarity score. If the determined string distance to the data set of the closest device exceeds a threshold value, the device accessing the network resources is new and its entry can be created. If the determined string distance is under a predetermined threshold value, it is determined that the device accessing the network resources is the device having the closest string distance value to the collected set of data points, and the values in a database and/or the network element of the previously known device can be updated based on the collected set of data points.

20 Claims, 3 Drawing Sheets

(51) Int. Cl.
*G06F 18/22* (2023.01)
*H04L 41/0816* (2022.01)
*H04L 41/12* (2022.01)

(56) References Cited

U.S. PATENT DOCUMENTS

| | | |
|---|---|---|
| 9,460,390 B1 | 10/2016 | Lin et al. |
| 2016/0234211 A1 | 8/2016 | Gu |
| 2019/0288852 A1 | 9/2019 | Shetye et al. |

METHOD FOR IDENTIFYING NETWORK DEVICES IN COMPUTER NETWORK AND AN APPARATUS CONFIGURED TO IDENTIFY NETWORK DEVICES IN COMPUTER NETWORK

This application claims priority to GB 2108754.9 filed Jun. 18, 2021, the entire contents of each of which are hereby incorporated by reference.

BACKGROUND OF THE INVENTION

Field of the Invention

The present invention relates to a method for identifying network devices in computer network and an apparatus, such as a network gateway, configured to identify network devices in computer network.

Description of the Related Art

A typical setup for Local Area Network (LAN) involves a network gateway (such as consumer-grade router) and network devices, connected to the gateway using Ethernet and Wi-Fi technologies. Administrators of the LAN are interested in obtaining the precise list of network devices for administrative and informational purposes for example for finding out about network operation, monitoring for compromised devices, configuring parental control and such operations.

Network devices possess one or multiple network interfaces. Each network interface can be assigned with multiple properties, e.g.:
1. one MAC address as a 48-bit number (example: 'C8: 94:BB:FA:D6:D4'),
2. one or multiple IP addresses as 32-bit or 128-bit number (example: '192.168.8.123'),
3. one hostname as empty or non-empty string (example: 'android-67ce15d444af').

Traditional systems have recognized the devices in the network based on their media access control address (MAC address) which is a unique identifier assigned to a network interface controller (NIC) for use as a network address in communications within a network segment. But in the recent years, to prevent third parties from using MAC-addresses to track devices, e.g. Android, Linux, iOS and Windows operating systems have implemented MAC-address randomization which can randomize MAC addresses for all WiFi connections. This makes it impossible to recognize reliably devices on the network only based on MAC-address. While in public networks this ambiguity serves valid privacy purpose, in trusted home and office networks it poses a problem for the administrator of the network.

Also, network devices with multiple network interfaces are common e.g. in laptop PCs which comprise a Wi-Fi interface and an Ethernet interface. The ambiguity in this situation comes as network device is represented in the network by several Network Interfaces with unstable properties.

Therefore, it would be desirable to identify a device reliably in the network also in the above-mentioned circumstances.

SUMMARY OF THE INVENTION

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

According to a first aspect, the invention relates to a method, e.g. a computer implemented method, for identifying devices in a computer network. The method comprises collecting a set of data points comprising device related parameters and/or device related information from a device accessing the resources of the network, determining a string distance between the set of collected data points with the data sets collected from previously known devices of the network and selecting the smallest string distance value and/or highest similarity score from the determined string distance values. If the determined string distance to the data set of the closest previously known device is above a predetermined threshold value, it is determined that the device accessing the network resources is a new device in the network and an entry for the device can be created to a database and/or the network element for the new device based on the collected set of data points. If the determined string distance to the data set of the closest previously known device is under a predetermined threshold value, it is determined that the device accessing the network resources is the device having the closest string distance value to the collected set of data points, and the values in a database and/or the network element of the previously known device can be updated based on the collected set of data points.

In one embodiment of the invention the method further comprises replacing or merging the previous data set values with the new collected values or if the device accessing the network resources is determined to be the same device as the previous device.

In one embodiment of the invention the method further comprises creating a new entry to the database if the device accessing the network resources is determined to be a new device.

In one embodiment of the invention the method further comprises collecting a set of data points is carried out by using at least one network fingerprinting method, e.g. network stack fingerprinting.

In one embodiment of the invention the determination of the string distance is carried out by edit distance algorithm with string matching between the collected data set and data sets of the previously known devices.

In one embodiment of the invention the collected and/or stored data set comprises at least one of the following: Model, Manufacturer, Device Type, OS Name, Hostname, MAC Addresses, IP Addresses In one embodiment of the invention the collected set of datapoints are stored to the database as multiple parameter values or as single value or values derived from the collected values.

In one embodiment of the invention the method is used to recognize devices utilizing MAC-address randomization functionality and/or devices using different or multiple network interfaces to access the network, such as Ethernet or WiFi.

According to a second aspect, the invention relates to an apparatus, such as a network gateway, for identifying devices in a computer network. The apparatus is configured to collect a set of data points comprising device related parameters and/or device related information from a device accessing the resources of the network, determine a string distance between the set of collected data points with the data sets collected from previously known devices of the network and select the smallest string distance value and/or highest similarity score from the determined string distance values. If the determined string distance to the data set of the closest previously known device is above a predetermined threshold value, the apparatus can be configured to determine that the device accessing the network resources is a new device in the network and/or to create an entry for the device to a database and/or the network element for the new device based on the collected set of data points. If the determined string distance to the data set of the closest previously known device is under a predetermined threshold value, the apparatus can be configured to determine that the device accessing the network resources is the device having the closest string distance value to the collected set of data points, and/or to update the values in a database and/or the network element of the previously known device based on the collected set of data points.

In one embodiment of the invention the arrangement is configured to carry out a method according to a solution of the invention.

According to a third aspect, the invention relates to a computer program comprising instructions which, when executed by a computer, cause the computer to carry out a method according to the invention.

According to a fourth aspect, the invention relates to a computer-readable medium comprising the computer program according to the invention.

The invention is able to solve for example the following earlier discussed challenges: recognizing devices in the network despite of MAC address randomization and despite multiple network interfaces, such as Wi-Fi interface and Ethernet interface. The solution of the invention can utilize e.g. network stack fingerprinting and edit distance algorithm in string matching to achieve this result. The metadata obtained with network fingerprinting adds new dimension to ambiguous network data, that makes it possible to identify devices with string distance algorithm.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated.

Furthermore, it is to be understood that the use of "a" or "an", i.e. a singular form, throughout this document does not exclude a plurality.

BRIEF DESCRIPTION OF THE DRAWINGS

The embodiments of the invention are illustrated by way of example, and not by way of limitation, in the figures of the accompanying drawings.

DESCRIPTION OF THE PREFERRED EMBODIMENTS

The solution of the invention can be used to recognize devices utilizing MAC-address randomization functionality and/or devices using different or multiple network interfaces to access the network, such as Ethernet or WiFi. In the solution of the invention a set of data points is collected from a device accessing the resources of the network comprising device related parameters and/or device related information. Based on collected data, a string distance between the set of collected data points with the data sets collected from previously known devices of the network is determined and the smallest string distance value and/or highest similarity score is selected from the determined string distance values. In one embodiment of the invention the determination of the string distance is carried out by edit distance algorithm with string matching between the collected data set and data sets of the previously known devices.

If the determined string distance to the data set of the closest previously known device is above a predetermined threshold value, it can be determined that the device accessing the network resources is a new device in the network and an entry for the device can be created to a database and/or the network element for the new device based on the collected set of data points. In one embodiment of the invention a new entry is created to the database if the device accessing the network resources is determined to be a new device.

If the determined string distance to the data set of the closest previously known device is under a predetermined threshold value, it can be determined that the device accessing the network resources is the device having the closest string distance value to the collected set of data points. In this case the values in a database and/or the network element of the previously known device can be updated based on the collected set of data points. In one embodiment of the invention the method further comprises replacing or merging the previous data set values with the new collected values or if the device accessing the network resources is determined to be the same device as the previous device.

In one embodiment of the invention the collected set of datapoints are stored to the database as multiple parameter values or as single value or values derived from the collected values. The collected and/or stored data set can comprise at least one of the following: Model, Manufacturer, Device Type, OS Name, Hostname, MAC Addresses, IP Addresses. Collecting a set of data points can be carried out by using for example at least one network fingerprinting method, e.g. network stack fingerprinting.

Figure 1:
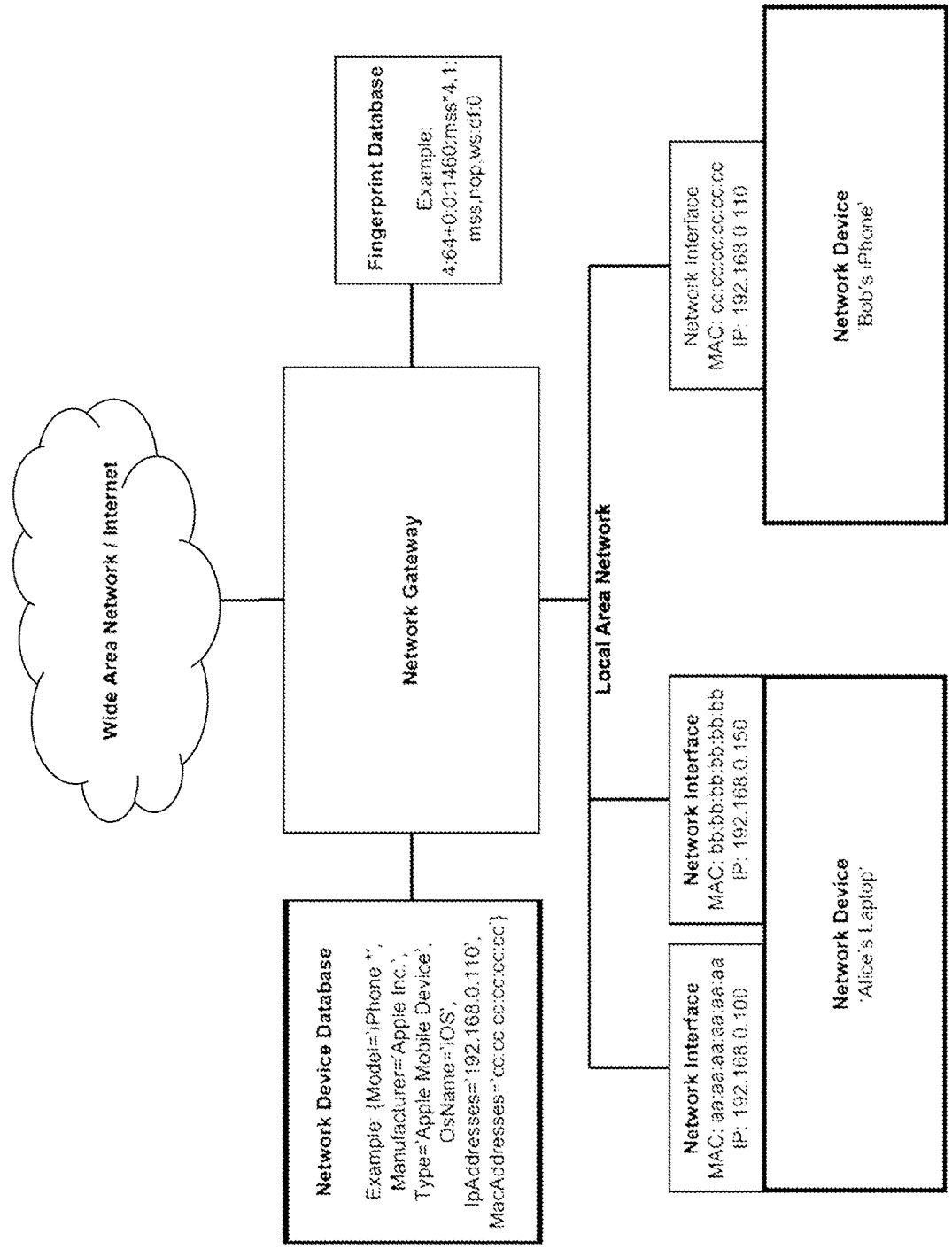
FIG. 1 presents as a schematic diagram a computer network configuration, for which exemplifying embodiments of the present invention are applicable.

FIG. 1 presents an example environment in which the solution of the invention can be used. In this example, network gateway operates in Local Area Network and maintains a network device database comprising e.g. the following properties of the network devices in the network: model, manufacturer, device type, operating system name, hostname, MAC addresses, IP addresses.

The network in which the solution of the present invention can be used can be any computer or communication network, including e.g. a (wired or wireless) local area network like LAN, WLAN, Ethernet, or the like, a (wired or wireless) wide area network like WiMAX, GSM, UMTS, LTE, or the like, and so on. Hence, the network device and the gateway can but do not need to be located at different locations. For example, the network may be any kind of TCP/IP-based network.

In the example embodiment of FIG. 1 one device in the network is a laptop named 'Alice's Laptop' with multiple network interfaces and random MAC address capability.

This specific laptop connects to the LAN in the example. Network gateway gains access to basic properties of 'Alice's Laptop' Network Interface: IP Addresses, MAC Address and Hostname. As 'Alice's Laptop' consumes network resources, the network gateway intercepts TCP/IP packets and carries out network fingerprinting, e.g. network stack fingerprinting, using a fingerprint database. The fingerprint database may be stored in the gateway and/or served as a cloud service. Network gateway gains access to extended list of properties, that characterize 'Alice's Laptop' as Network Device, such as: model, manufacturer, device type and OS name. Network gateway can send a query to the network device database for records with edit distance score to the properties greater than the matching threshold T. The one with the highest score can be selected as result.

In case 'Alice's Laptop' is connecting to the LAN for the first time, the query result is empty because no previous record gives a similarity score higher than the matching threshold T. In this case network gateway creates a new record for 'Alice's Laptop' in the network device database using the properties of the device, such as model, manufacturer, device type and OS name.

In case 'Alice's Laptop' has earlier connected to the LAN with the same network interface and MAC address, the query finds an existing record. In case 'Alice's Laptop' has earlier connected to the LAN with the same network interface and different MAC address, the query can also find an existing record. In case 'Alice's Laptop' has earlier connected the LAN with different network interface, the query can also in this case find an existing record. Network gateway can merge the collected properties relating to the device with the existing record which was found to correspond the device. Also 'Bob's iPhone' network device is in the present in the local area network but it can be determined with the solution of the invention, e.g. by network fingerprinting, that this network device is not same device as 'Alice's Laptop'.

The edit string distance or edit distance used in the solution of the invention to determine to which device the collected data belongs, refers to the minimum number of operations needed to transform one string into another, for which is possible to insert, delete or substitute a character. The edit string distance or edit distance problem has several variants that include using other operations or assign weights to each one. It can be efficiently solved using dynamic programming and the result can be used to measure the dissimilarity between two strings.

The network fingerprinting or network stack fingerprinting used in the solution of the invention refers is a passive method to collect configuration attributes from a device during network communications, such data can be used to identify specific device properties (e.g. Operating System). Using this method, e.g. the following attributes can be discovered:

```
NetworkDevice = {           NetworkInterface =      FingerprintingResult
  model: string,            {                       = {
  manufacturer:               hostname: string,       model: string,
string,                       mac_address:            manufacturer:
  device_type: string,      string,                 string,
  os_name: string,            ip_address_list:        device_type:
  hostname: string,         string[ ]               string,
  mac_address_list:         }                         os: string
string[ ],                                          }
  ip_address_list:
string[ ]
}
```

In the following Table 1, some examples are given for metadata collected by network stack fingerprinting from the devices of the example network.

TABLE 1

Metadata from network stack fingerprinting

| Device | Fingerprint Metadata |
|---|---|
| A01 | Galaxy-S8-1; Phone, Tablet or Wearable/Generic Android/Samsung Android; Samsung Galaxy S8+; Samsung; Android OS;; |
| A02 | android-1; Phone, Tablet or Wearable/Generic Android; Samsung Android; Samsung; Android OS;; |
| A03 | amazon-c1; Internet of Things (IoT)/Amazon; Amazon Alexa; Amazon Technologies Inc.; Android OS;; |
| A04 | amazon-c2; Internet of Things (IoT)/Amazon; Amazon Fire TV; Amazon Technologies Inc.; Android OS;; |
| A05 | amazon-c3; Internet of Things (IoT)/Home Assistant; Amazon Alexa; Amazon Technologies Inc.; Android OS;; |
| A06 | amazon-c4; Internet of Things (IoT)/Home Assistant; Amazon Fire TV; Amazon Technologies Inc.; Android OS;; |
| A07 | amazon-c5; Audio, Imaging or Video Equipment/Set-top Box; Amazon Alexa; Amazon Technologies Inc.; Android OS;; |
| A08 | amazon-c6; Audio, Imaging or Video Equipment/Set-top Box; Amazon Fire TV; Amazon Technologies Inc.; Android OS;; |
| A09 | android-2; Phone, Tablet or Wearable/Generic Android/Samsung Android; Samsung Galaxy Note 3; Samsung; Android OS;; |
| A10 | Phone1, Tablet or Wearable/Generic Android/Google Android; Google Pixel XL; HTC Corporation; Android OS;; |
| A11 | android-3; Phone, Tablet or Wearable/Generic Android/Asus Android; Asus Nexus 7 (2013); ASUSTek COMPUTER INC.; Android OS;; |
| A12 | Galaxy-Note-9; Phone, Tablet or Wearable/Generic Android/Samsung Android; Samsung Galaxy Note9; Samsung; Android OS;; |
| A13 | Phone2, Tablet or Wearable/Generic Android/Nokia Android; Nokia 8; HMD Global Oy; Android OS;; |
| A14 | OnePlus6-1; Phone, Tablet or Wearable/Generic Android/OnePlus Android; OnePlus 6; OnePlus Technology (Shenzhen) Co., Ltd; Android OS;; |
| I01 | iPhone8-1; Phone, Tablet or Wearable/Apple Mobile Device/Apple iPhone; iPhone 8 (no CDMA); Apple, Inc.; iOS;; |
| I02 | iPad-1; Phone, Tablet or Wearable/Apple Mobile Device/Apple iPad; iPad mini 2nd Gen (WiFi + Cellular); Apple, Inc.; iOS;; |
| I03 | iPhone-2; Phone, Tablet or Wearable/Apple Mobile Device/Apple iPhone; iPhone 7 Plus (no CDMA); Apple, Inc.; iOS;; |
| I04 | iPad-Air-1; Phone, Tablet or Wearable/Apple Mobile Device/Apple iPad; iPad Air 1st Gen (WiFi); Apple, Inc.; iOS;; |
| I05 | iPhone-6-1; Phone, Tablet or Wearable/Apple Mobile Device/Apple iPhone; iPhone 6; Apple, Inc.; iOS;; |
| I06 | iPhone-3; Phone, Tablet or Wearable/Apple Mobile Device; Apple iPhone; Apple, Inc.; iOS;; |
| I07 | iPad-2; Phone, Tablet or Wearable/Apple Mobile Device/Apple iPad; iPad Air 1st Gen (WiFi); Apple, Inc.; iOS;; |
| I08 | iPod-1; Phone, Tablet or Wearable/Apple Mobile Device/Apple iPod; iPod 6th Gen; Apple, Inc.; iOS;; |
| I09 | iPhone-8-1; Phone, Tablet or Wearable/Apple Mobile Device; Apple iPhone; Apple, Inc.; iOS;; |
| I10 | iPhone-6s-1; Phone, Tablet or Wearable/Apple Mobile Device/Apple iPhone; iPhone 6s; Apple, Inc.; iOS;; |
| I11 | iPhone-7-1; Phone, Tablet or Wearable/Apple Mobile Device/Apple iPhone; iPhone 7 (no CDMA); Apple, Inc.; iOS;; |
| I12 | iPhone-6s-2; Phone, Tablet or Wearable/Apple Mobile Device/Apple iPhone; iPhone 6s; Apple, Inc.; iOS;; |
| I13 | Iphone-6s-3; Phone, Tablet or Wearable/Apple Mobile Device/Apple iPhone; iPhone 6s; Apple, Inc.; iOS;; |
| I14 | iPod-touch-1; Phone, Tablet or Wearable/Apple Mobile Device/Apple iPod; iPod 6th Gen; Apple, Inc.; iOS;; |

In the following Table 2, some examples of determined edit string distances between Android network devices are presented. As can be seen from the Table 2, the minimum string distance between different devices is 0.24 and maximum string distance between different devices is 0.78. In one example embodiment the string distance between identical devices can be 1.

TABLE 2

Edit string distance between Android Network Devices

|     | A01 | A02 | A03 | A04 | A05 | A06 | A07 | A08 | A09 | A10 | A11 | A12 | A13 | A14 |
|-----|-----|-----|-----|-----|-----|-----|-----|-----|-----|-----|-----|-----|-----|-----|
| A01 | 1   |     |     |     |     |     |     |     |     |     |     |     |     |     |
| A02 | 0.54 | 1  |     |     |     |     |     |     |     |     |     |     |     |     |
| A03 | 0.29 | 0.29 | 1 |     |     |     |     |     |     |     |     |     |     |     |
| A04 | 0.28 | 0.28 | 0.76 | 1 |     |     |     |     |     |     |     |     |     |     |
| A05 | 0.28 | 0.28 | 0.78 | 0.71 | 1 |     |     |     |     |     |     |     |     |     |
| A06 | 0.27 | 0.26 | 0.71 | 0.78 | 0.76 | 1 |     |     |     |     |     |     |     |     |
| A07 | 0.29 | 0.29 | 0.69 | 0.62 | 0.69 | 0.62 | 1 |     |     |     |     |     |     |     |
| A08 | 0.28 | 0.28 | 0.62 | 0.69 | 0.62 | 0.69 | 0.76 | 1 |     |     |     |     |     |     |
| A09 | 0.63 | 0.58 | 0.28 | 0.28 | 0.28 | 0.28 | 0.29 | 0.29 | 1 |     |     |     |     |     |
| A10 | 0.34 | 0.30 | 0.25 | 0.27 | 0.25 | 0.27 | 0.25 | 0.27 | 0.35 | 1 |     |     |     |     |
| A11 | 0.34 | 0.38 | 0.30 | 0.30 | 0.30 | 0.30 | 0.30 | 0.30 | 0.42 | 0.36 | 1 |     |     |     |
| A12 | 0.71 | 0.54 | 0.28 | 0.28 | 0.28 | 0.28 | 0.29 | 0.28 | 0.66 | 0.34 | 0.36 | 1 |     |     |
| A13 | 0.34 | 0.30 | 0.24 | 0.27 | 0.24 | 0.26 | 0.24 | 0.27 | 0.33 | 0.40 | 0.35 | 0.36 | 1 |     |
| A14 | 0.35 | 0.32 | 0.29 | 0.30 | 0.29 | 0.30 | 0.29 | 0.30 | 0.36 | 0.36 | 0.38 | 0.35 | 0.35 | 1 |

In the following Table 3, some examples of determined edit string distances between iOS network devices are presented. As can be seen from the Table 3, the minimum string distance between different devices is 0.49 and maximum string distance between different devices is 0.72.

TABLE 3

Edit string distance between iOS Network Devices

|     | I01 | I02 | I03 | I04 | I05 | I06 | I07 | I08 | I09 | I10 | I11 | I12 | I13 | I14 |
|-----|-----|-----|-----|-----|-----|-----|-----|-----|-----|-----|-----|-----|-----|-----|
| I01 | 1   |     |     |     |     |     |     |     |     |     |     |     |     |     |
| I02 | 0.56 | 1  |     |     |     |     |     |     |     |     |     |     |     |     |
| I03 | 0.65 | 0.55 | 1 |     |     |     |     |     |     |     |     |     |     |     |
| I04 | 0.54 | 0.63 | 0.54 | 1 |     |     |     |     |     |     |     |     |     |     |
| I05 | 0.59 | 0.53 | 0.56 | 0.60 | 1 |     |     |     |     |     |     |     |     |     |
| I06 | 0.52 | 0.51 | 0.50 | 0.49 | 0.56 | 1 |     |     |     |     |     |     |     |     |
| I07 | 0.57 | 0.67 | 0.60 | 0.69 | 0.52 | 0.52 | 1 |     |     |     |     |     |     |     |
| I08 | 0.55 | 0.55 | 0.53 | 0.58 | 0.56 | 0.52 | 0.58 | 1 |     |     |     |     |     |     |
| I09 | 0.50 | 0.52 | 0.50 | 0.52 | 0.61 | 0.72 | 0.51 | 0.52 | 1 |     |     |     |     |     |
| I10 | 0.65 | 0.54 | 0.57 | 0.55 | 0.68 | 0.54 | 0.54 | 0.54 | 0.52 | 1 |     |     |     |     |
| I11 | 0.69 | 0.55 | 0.63 | 0.57 | 0.66 | 0.56 | 0.53 | 0.57 | 0.57 | 0.60 | 1 |     |     |     |
| I12 | 0.60 | 0.56 | 0.60 | 0.55 | 0.68 | 0.53 | 0.55 | 0.54 | 0.53 | 0.70 | 0.56 | 1 |     |     |
| I13 | 0.59 | 0.54 | 0.57 | 0.52 | 0.67 | 0.53 | 0.54 | 0.54 | 0.53 | 0.69 | 0.59 | 0.69 | 1 |     |
| I14 | 0.59 | 0.54 | 0.53 | 0.58 | 0.56 | 0.52 | 0.55 | 0.71 | 0.53 | 0.59 | 0.55 | 0.55 | 0.57 | 1 |

TABLE 4

Edit string distance between Android and iOS Network Devices

|     | A01 | A02 | A03 | A04 | A05 | A06 | A07 | A08 | A09 | A10 | A11 | A12 | A13 | A14 |
|-----|-----|-----|-----|-----|-----|-----|-----|-----|-----|-----|-----|-----|-----|-----|
| I01 | 0.15 |    |     |     |     |     |     |     |     |     |     |     |     |     |
| I02 | 0.20 | 0.21 |   |     |     |     |     |     |     |     |     |     |     |     |
| I03 | 0.18 | 0.18 | 0.17 |   |     |     |     |     |     |     |     |     |     |     |
| I04 | 0.17 | 0.21 | 0.16 | 0.17 |   |     |     |     |     |     |     |     |     |     |
| I05 | 0.18 | 0.19 | 0.19 | 0.20 | 0.19 |   |     |     |     |     |     |     |     |     |
| I06 | 0.16 | 0.21 | 0.17 | 0.19 | 0.17 | 0.19 |   |     |     |     |     |     |     |     |
| I07 | 0.19 | 0.21 | 0.17 | 0.18 | 0.18 | 0.19 | 0.18 |   |     |     |     |     |     |     |
| I08 | 0.17 | 0.19 | 0.14 | 0.16 | 0.14 | 0.16 | 0.14 | 0.17 |   |     |     |     |     |     |
| I09 | 0.17 | 0.20 | 0.17 | 0.19 | 0.17 | 0.19 | 0.17 | 0.19 | 0.19 |   |     |     |     |     |
| I10 | 0.18 | 0.21 | 0.19 | 0.21 | 0.19 | 0.21 | 0.19 | 0.21 | 0.18 | 0.16 |   |     |     |     |
| I11 | 0.18 | 0.19 | 0.17 | 0.18 | 0.17 | 0.18 | 0.17 | 0.18 | 0.18 | 0.17 | 0.22 |   |     |     |
| I12 | 0.18 | 0.19 | 0.18 | 0.20 | 0.18 | 0.20 | 0.18 | 0.20 | 0.18 | 0.16 | 0.21 | 0.18 |   |     |

TABLE 4-continued

Edit string distance between Android and iOS Network Devices

|     | A01  | A02  | A03  | A04  | A05  | A06  | A07  | A08  | A09  | A10  | A11  | A12  | A13  | A14  |
|-----|------|------|------|------|------|------|------|------|------|------|------|------|------|------|
| I13 | 0.19 | 0.21 | 0.19 | 0.21 | 0.19 | 0.21 | 0.19 | 0.21 | 0.20 | 0.16 | 0.24 | 0.20 | 0.17 |      |
| I14 | 0.18 | 0.20 | 0.16 | 0.18 | 0.16 | 0.18 | 0.16 | 0.19 | 0.19 | 0.16 | 0.22 | 0.20 | 0.18 | 0.17 |

In the above Table 4, some examples of determined edit string distances between Android and iOS network devices are presented. As can be seen from the Table 4, the minimum string distance is 0.12 and maximum string distance is 0.22.

It is possible to set thresholds for the similarity scores between devices to identify devices based on the available attributes. With the parameters used to generate the previous results, it is possible to have device pairs that produce high similarity score, e.g. devices A3: {amazon-c1; Internet of Things (IoT)/Amazon; Amazon Alexa; Amazon Technologies Inc.; Android OS;} and A5: { amazon-c3;Internet of Things (IoT)/Home Assistant; Amazon Alexa; Amazon Technologies Inc.; Android OS;} from Table 1 have similarity score of 0.78, those values would be used to estimate matching thresholds for similarity scores between devices (or classes of devices).

In one embodiment of the invention the collected set of datapoints are stored to the database as multiple parameter values or as single value or values derived from the collected values.

In one embodiment of the invention the method is used to recognize devices utilizing MAC-address randomization functionality and/or devices using different or multiple network interfaces to access the network, such as Ethernet or WiFi.

Figure 2:
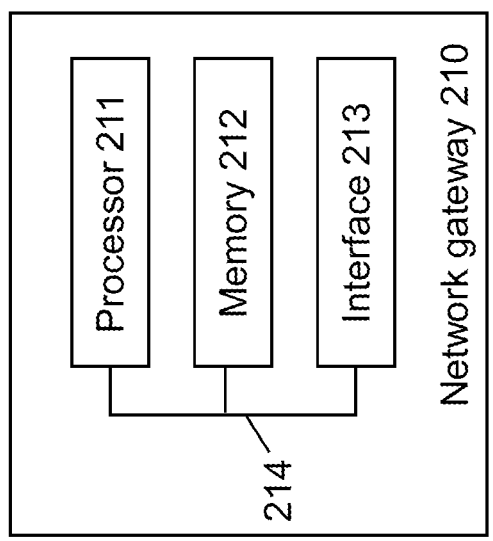
FIG. 2 presents as a schematic diagram an example of a structure of an apparatus according to exemplifying embodiments of the present invention.

As presented in FIG. 2, an apparatus 210 or at least part of the apparatus, e.g. a gateway, according to exemplifying embodiments of the present invention may comprise at least one processor 211 and at least one memory 212 (and possibly also at least one interface 213), which may be operationally connected or coupled, for example by a bus 214 or the like, respectively.

The processor 211 of the apparatus 210 is configured to read and execute computer program code stored in the memory 212. The processor may be represented by a CPU (Central Processing Unit), a MPU (Micro Processor Unit), etc., or a combination thereof.

The memory 212 of the apparatus 210 is configured to store computer program code, such as respective programs, computer/processor-executable instructions, macros or applets, etc. or parts of them. Such computer program code, when executed by the processor 211, enables the apparatus 210 to operate in accordance with exemplifying embodiments of the present invention. The memory 212 may be represented by a RAM (Random Access Memory), a ROM (Read Only Memory), a hard disk, a secondary storage device, etc., or a combination of two or more of these. The interface 213 of the apparatus 210 is configured to interface with another arrangement and/or the user of the apparatus 210. That is, the interface 213 may represent a communication interface e.g. for local area network like LAN, WLAN, Ethernet, or the like, a (wired or wireless) wide area network like WiMAX, GSM, UMTS, LTE, or the like, and/or e.g. a modem, an antenna, a transmitter, a receiver, a transceiver, or the like, and/or a user interface (such as buttons, signal lights, a display and/or touch screen, keyboard, mouse, signal light, loudspeaker, or the like).

In the solution of the invention, recognizing devices can be utilized in carrying out further actions, such as allowing or preventing different network related activities, based on the recognized device or a group to which the recognized device belongs. In an embodiment, further actions may be related to services or restrictions done by the recognized device, e.g. family control related restrictions.

Figure 3:
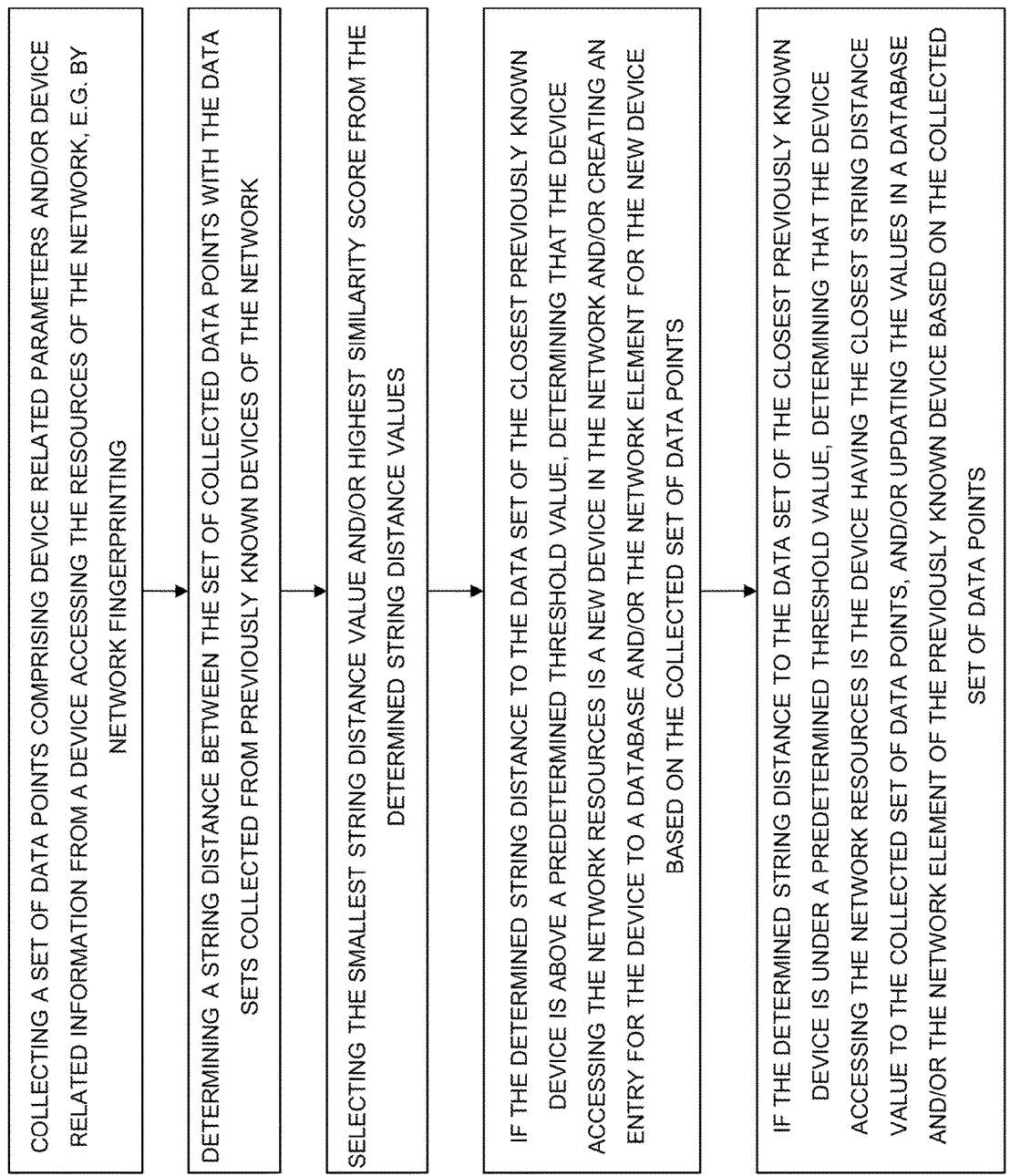
FIG. 3 presents an example method according to one embodiment of the invention.

FIG. 3 presents an example method according to one embodiment of the invention. In the method a set of data points comprising device related parameters and/or device related information are collected from a device accessing the resources of the network. The data points can be collected e.g. with a network fingerprinting method. A string distance between the set of collected data points with the data sets collected from previously known devices of the network is determined and the smallest string distance value and/or highest similarity score is selected from the determined string distance values. In the method, if the determined string distance to the data set of the closest previously known device is above a predetermined threshold value, it is determined that the device accessing the network resources is a new device in the network and an entry for the device can be created to a database and/or the network element for the new device based on the collected set of data points. In the method, if the determined string distance to the data set of the closest previously known device is under a predetermined threshold value, it is determined that the device accessing the network resources is the device having the closest string distance value to the collected set of data points, and the values in a database and/or the network element of the previously known device can be updated based on the collected set of data points.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein. Lists and groups of examples provided in the description given above are not exhaustive unless otherwise explicitly stated.

The invention claimed is:

1. A method for identifying devices in a computer network, wherein the method comprises:
   collecting a set of data points comprising device related parameters and/or device related information from a device accessing the resources of the network,
   determining a string distance between the set of collected data points with the data sets collected from previously known devices of the network,
   selecting the smallest string distance value and/or highest similarity score from the determined string distance values, and if the determined string distance to the data set of the closest previously known device is above a predetermined threshold value, determining that the device accessing the network resources is a new device in the network and/or creating an entry for the device to a database and/or the network element for the new device based on the collected set of data points, and if the determined string distance to the data set of the closest previously known device is under a predetermined threshold value, determining that the device accessing the network resources is the device having the closest string distance value to the collected set of data points, and/or updating the values in a database and/or the network element of the previously known device based on the collected set of data points.

2. The method according to claim 1, wherein the method further comprises replacing or merging the previous data set values with the new collected values or if the device accessing the network resources is determined to be the same device as the previous device.

3. The method according to claim 1, wherein the method further comprises creating a new entry to the database if the device accessing the network resources is determined to be a new device.

4. The method according to claim 1, wherein the method further comprises collecting a set of data points is carried out by using at least one network fingerprinting method.

5. The method according to claim 1, wherein the determination of the string distance is carried out by edit distance algorithm with string matching between the collected data set and data sets of the previously known devices.

6. The method according to claim 1, wherein the collected and/or stored data set comprises at least one of the following: Model, Manufacturer, Device Type, OS Name, Hostname, MAC Addresses, IP Addresses.

7. The method according to claim 1, wherein the collected set of datapoints are stored to the database as multiple parameter values or as single value or values derived from the collected values.

8. The method according to claim 1, wherein the method is used to recognize devices utilizing MAC-address randomization functionality and/or devices using different or multiple network interfaces to access the network.

9. An apparatus for identifying devices in a computer network, wherein the apparatus is configured to collect a set of data points comprising device related parameters and/or device related information from a device accessing the resources of the network, determine a string distance between the set of collected data points with the data sets collected from previously known devices of the network, select the smallest string distance value and/or highest similarity score from the determined string distance values, and if the determined string distance to the data set of the closest previously known device is above a predetermined threshold value, the apparatus is further configured to determine that the device accessing the network resources is a new device in the network and/or to create an entry for the device to a database and/or the network element for the new device based on the collected set of data points, and if the determined string distance to the data set of the closest previously known device is under a predetermined threshold value, the apparatus is further configured to determine that the device accessing the network resources is the device having the closest string distance value to the collected set of data points, and/or to update the values in a database and/or the network element of the previously known device based on the collected set of data points.

10. An arrangement comprising an apparatus for identifying devices in a computer network, wherein the apparatus is configured to collect a set of data points comprising device related parameters and/or device related information from a device accessing the resources of the network, determine a sting distance between the set of collected data points with the data sets collected from previously known devices of the network, select the smallest string distance value and/or highest similarity score from the determined string distance values, and if the determined string distance to the data set of the closest previously known device is above a predetermined threshold value, the apparatus is further configured to determine that the device accessing the network resources is a new device in the network and/or to create an entry for the device to a database and/or the network element for the new device based on the collected set of data points, and if the determined string distance to the data set of the closest previously known device is under a predetermined threshold value, the apparatus is further configured to determine that the device accessing the network resources is the device having the closest string distance value to the collected set of data points, and/or to update the values in a database and/or the network element of the previously known device based on the collected set of data points, wherein the arrangement is configured to carry out a method according to claim 2.

11. A non-transitory computer-readable medium on which is stored a computer program comprising instructions which, when executed by a computer, cause the computer to carry out the method according to claim 1.

12. The method of claim 4, wherein the at least one network fingerprinting method comprises network stack fingerprinting.

13. The method according to claim 2, wherein the method further comprises creating a new entry to the database if the device accessing the network resources is determined to be a new device.

14. The method according to claim 2, wherein the method further comprises collecting a set of data points is carried out by using at least one network fingerprinting method.

15. The method according to claim 3, wherein the method further comprises collecting a set of data points is carried out by using at least one network fingerprinting method.

16. The method according to claim 2, wherein the determination of the string distance is carried out by edit distance algorithm with string matching between the collected data set and data sets of the previously known devices.

17. The method according to claim 3, wherein the determination of the string distance is carried out by edit distance algorithm with string matching between the collected data set and data sets of the previously known devices.

18. The method according to claim 4, wherein the determination of the string distance is carried out by edit distance algorithm with string matching between the collected data set and data sets of the previously known devices.

19. The method according to claim 2, wherein the collected and/or stored data set comprises at least one of the following: Model, Manufacturer, Device Type, OS Name, Hostname, MAC Addresses, IP Addresses.

20. The method according to claim 3, wherein the collected and/or stored data set comprises at least one of the following: Model, Manufacturer, Device Type, OS Name, Hostname, MAC Addresses, IP Addresses.

\* \* \* \* \*